(12) United States Patent
Lee et al.

(10) Patent No.: US 12,153,123 B2
(45) Date of Patent: Nov. 26, 2024

(54) DNN-BASED HUMAN FACE CLASSIFICATION

(71) Applicant: Bitsensing Inc., Seoul (KR)

(72) Inventors: Jae-Eun Lee, Seoul (KR); Hae-Seung Lim, Sung-Nam (KR); Seongwook Lee, Seoul (KR)

(73) Assignee: Bitsensing Inc., Seoul (KR)

( * ) Notice: Subject to any disclaimer, the term of this patent is extended or adjusted under 35 U.S.C. 154(b) by 595 days.

(21) Appl. No.: 17/229,529

(22) Filed: Apr. 13, 2021

(65) Prior Publication Data

US 2021/0326581 A1    Oct. 21, 2021

Related U.S. Application Data

(60) Provisional application No. 63/009,643, filed on Apr. 14, 2020.

(51) Int. Cl.
*G01S 13/88* (2006.01)
*G01S 7/35* (2006.01)
(Continued)

(52) U.S. Cl.
CPC ............. *G01S 13/88* (2013.01); *G01S 7/356* (2021.05); *G01S 7/412* (2013.01); *G01S 7/417* (2013.01); *G06F 17/142* (2013.01); *G06F 18/214* (2023.01); *G06N 3/04* (2013.01); *G06N 3/088* (2013.01); *G06V 10/82* (2022.01); *G06V 40/171* (2022.01); *G06V 40/172* (2022.01)

(58) Field of Classification Search
CPC .......... G01S 13/88; G01S 7/356; G01S 7/412; G01S 7/417; G06V 40/171; G06V 40/172; G06V 10/82; G06F 18/214; G06F 17/142; G06N 3/04; G06N 3/088
See application file for complete search history.

(56) References Cited

U.S. PATENT DOCUMENTS

| | | |
|---|---|---|
| 11,391,814 B2 * | 7/2022 | Cohen .................... G01S 7/295 |
| 2013/0001422 A1 * | 1/2013 | Lavon .................... G01S 13/42 |
| | | 250/393 |

(Continued)

FOREIGN PATENT DOCUMENTS

| | | |
|---|---|---|
| JP | 2013068433 A | 4/2013 |
| JP | 2020204603 A | 12/2020 |

(Continued)

*Primary Examiner* — Timothy A Brainard
*Assistant Examiner* — Kenneth W Good
(74) *Attorney, Agent, or Firm* — Dinsmore & Shohl LLP; Yongsok Choi, Esq.

(57) ABSTRACT

Extracting target information from signals of a radar and measurement environments, including: transmitting frequency-modulated continuous wave transmit signal using the radar; receiving reflected signal reflected from a human face at multiple antenna elements; multiplying the transmit signal with the reflected signal using a mixer to produce a mixed signal; passing the mixed signal through a low pass filter to produce a baseband signal including sinusoidal signals; extracting a frequency of each sinusoidal signal from the baseband signal to produce extracted frequencies; and measuring a distance between the human face and the radar using the extracted frequencies.

16 Claims, 13 Drawing Sheets
(9 of 13 Drawing Sheet(s) Filed in Color)

(51) Int. Cl.

| | | |
|---|---|---|
| *G01S 7/41* | (2006.01) | |
| *G06F 17/14* | (2006.01) | |
| *G06F 18/214* | (2023.01) | |
| *G06N 3/04* | (2023.01) | |
| *G06N 3/088* | (2023.01) | |
| *G06V 10/82* | (2022.01) | |
| *G06V 40/16* | (2022.01) | |

(56) References Cited

U.S. PATENT DOCUMENTS

| | | | |
|---|---|---|---|
| 2018/0157916 A1* | 6/2018 | Doumbouya | G06V 40/103 |
| 2019/0011534 A1 | 1/2019 | Trotta et al. | |
| 2019/0285725 A1* | 9/2019 | Roger | G01S 7/023 |
| 2019/0317191 A1* | 10/2019 | Santra | G01S 13/881 |
| 2020/0025877 A1 | 1/2020 | Sarkis et al. | |
| 2020/0166609 A1* | 5/2020 | Trotta | G01S 7/417 |
| 2020/0234030 A1* | 7/2020 | Baheti | G01S 7/412 |
| 2020/0292662 A1* | 9/2020 | Boulanger | G01S 7/06 |
| 2020/0293753 A1* | 9/2020 | Sehgal | H04L 63/0861 |
| 2020/0300970 A1* | 9/2020 | Nguyen | G01S 13/88 |
| 2021/0141052 A1* | 5/2021 | Hsiao | G01S 7/354 |
| 2021/0183072 A1* | 6/2021 | Puri | G06N 3/08 |
| 2021/0320825 A1* | 10/2021 | Banuli Nanje Gowda | H04L 25/03968 |

FOREIGN PATENT DOCUMENTS

| | | |
|---|---|---|
| KR | 1020190005740 A | 1/2019 |
| KR | 1020190091817 A | 8/2019 |

* cited by examiner 240   200        212

DNN-BASED HUMAN FACE CLASSIFICATION

CROSS-REFERENCE TO RELATED APPLICATIONS

This application claims the benefit of priority under 35 U.S.C. § 119(e) of U.S. Provisional Patent Application No. 63/009,643, filed Apr. 14, 2020, entitled "DNN-Based Human Face Classification Using 61 GHz FMCW Radar Sensor." The disclosure of the above-referenced application is incorporated herein by reference.

BACKGROUND

Field of the Invention

The present disclosure relates to a human face classification, and more specifically, to a deep neural network-based human face classification.

Background

Radio detection and ranging (i.e., radar) sensors are widely used for many different purposes in various fields. Recently, as the frequency band and the bandwidth used by radar sensors have been expanded to the millimeter wave band, interest in radars with smaller size and higher range resolution has increased. That is, the miniaturization of radar sensors is being achieved, and the radar sensor is expected to be utilized for other purposes.

SUMMARY

The present disclosure describes human face classification.

In one implementation, a method for extracting target information from signals of a radar and measurement environments is disclosed. The method includes: transmitting frequency-modulated continuous wave transmit signal using the radar; receiving reflected signal reflected from a human face at multiple antenna elements; multiplying the transmit signal with the reflected signal using a mixer to produce a mixed signal; passing the mixed signal through a low pass filter to produce a baseband signal including sinusoidal signals; extracting a frequency of each sinusoidal signal from the baseband signal to produce extracted frequencies; and measuring a distance between the human face and the radar using the extracted frequencies.

In another implementation, a method is disclosed. The method includes: receiving input signal from each of a plurality of receiving antenna elements of the radar, wherein the input signal is a reflected signal from a face; low pass filtering the input signal to produce a filtered output; passing the filtered output through an analog-to-digital converter and sampling at a sampling frequency to produce a discrete filter output; applying a transform to the discrete filter output to calculate a distance between the face and the radar; and applying a false alarm rate detection technique to the transformed output to produce a frequency index corresponding to the distance.

In yet another implementation, a non-transitory computer-readable storage medium storing a computer program to extract target information from signals of a radar and measurement environments is disclosed. The computer program includes executable instructions that cause a computer to: transmit frequency-modulated continuous wave transmit signal using the radar; receive reflected signal reflected from a human face at multiple antenna elements; multiply the transmit signal with the reflected signal using a mixer to produce a mixed signal; pass the mixed signal through a low pass filter to produce a baseband signal including sinusoidal signals; extract a frequency of each sinusoidal signal from the baseband signal to produce extracted frequencies; and measure a distance between the human face and the radar using the extracted frequencies.

Other features and advantages of the present disclosure should be apparent from the present description which illustrates, by way of example, aspects of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The details of the present disclosure, both as to its structure and operation, may be gleaned in part by study of the appended drawings, in which like reference numerals refer to like parts, and in which.

DETAILED DESCRIPTION

Figure 1:
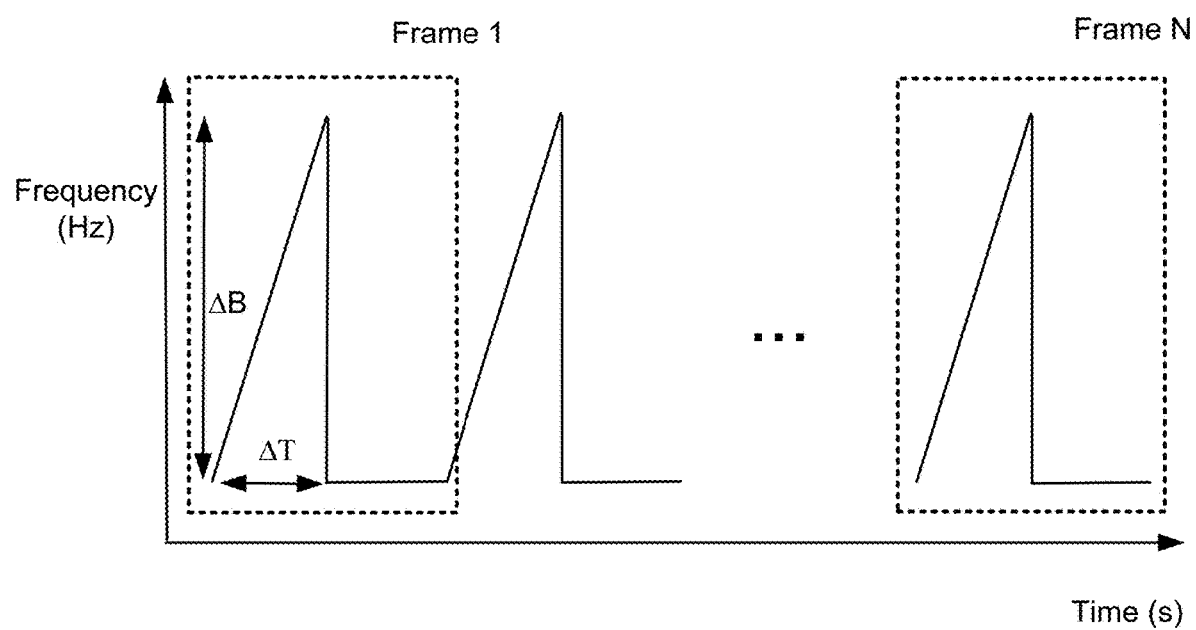
FIG. 1 shows the time-frequency slope of the transmitted FMCW radar signal in accordance with one implementation of the present disclosure.

As stated above, the radar sensors are widely used for many different purposes in various fields. As the frequency band and the bandwidth used by radar sensors have been expanded to the millimeter wave band, interest in radars with smaller size and higher range resolution has increased. That is, the miniaturization of radar sensors is being achieved, and the radar sensor is expected to be utilized for purposes other than the traditional purposes. In one case, the radar is being integrated into smartphones for face and gesture recognition. In another case, the ultra-wideband (UWB) radar is being integrated into smartphones to locate other smartphones.

Certain implementations of the present disclosure provide for classifying human faces using a small-sized millimeter wave radar sensor. In one implementation, the radar sensor transmits a frequency-modulated continuous waveform (e.g., operating in the 61 GHz band) and receives reflected signals using spatially separated receiving antenna elements. Because the shape and the composition of the human face varies from person to person, the reflection characteristics of the radar signal are also distinguished from each other. Using signals received from multiple antenna elements, the deep neural network (DNN) can be trained for human face classification. When training DNN with actual radar signals, multiple human faces can be classified with high accuracy.

After reading these descriptions, it will become apparent how to implement the disclosure in various implementations and applications. However, although various implementations of the present disclosure will be described herein, it is to be understood that these implementations are presented by way of example only, and not limitation. As such, this detailed description of various implementations should not be construed to limit the scope or breadth of the present disclosure.

I. Introduction

In this disclosure, a proposal is made to not only recognize human faces with a small-sized radar sensor, but also to distinguish faces of different people. With the rapid development of machine learning techniques, research on target classification using a radar sensor has been actively conducted in recent years. For example, various human behaviors were classified applying machine learning techniques to radar sensor data. Further, some have proposed to identify radar targets, such as pedestrians, cyclists, and automobiles, using automotive radar sensors. Even recently, studies have been conducted to distinguished unmanned aerial vehicles by reflected radar signals. All of these target classification studies are based on the fact that the reflection properties of object are different. Likewise, because the shape and composition of a person's face are also different for each individual, the human face can be sufficiently distinguished if appropriate machine learning technique is applied to radar data. Through face classification using radio waves, the weakness of the camera-based face recognition method can be compensated.

In one implementation of the present disclosure, the radar sensor operates at the center frequency of 61 GHz and transmits a frequency-modulated continuous wave (FMCW). Then, signals reflected on the human face are received by multiple receiving antenna elements. Because the antenna elements are arranged in the elevation and azimuth directions, the spatial facial features of the person are contained in the received signals. Further, because the constituents of the face are different for each person, the reflection characteristics are different for each person. Thus, if signals received from multiple antenna elements are concatenated and used as inputs to the deep neural network (DNN), an effective classifier can be designed to distinguish each person's face.

In one implementation of the present disclosure, the classification performance of the proposed DNN-based face classification method is evaluated, and is compared with other existing feature-based machine learning techniques. The advantage of the proposed DNN-based method is that it does not require a feature extraction stage. The applicability of DNN to the radar sensor data has already been confirmed. However, most deep learning-based target classification studies focused on large-scale radar systems operating in low-frequency bands or relatively distant targets.

Implementations disclosed in Section II describe a signal processing method for extracting target information from radar signals and signal measurement environments. Implementations disclosed in Section III describe a method for training the DNN with the acquired radar signal and its classification results. Section IV includes a conclusion.

II. Target Measurement Using 61 GHZ FMCW Radar

A. Signal Processing in FMCW Radar

In the FMCW radar system, the frequency of a transmitted signal changes linearly over time. FIG. 1 shows the time-frequency slope of the transmitted FMCW radar signal, where 1, 2, . . . , N are the indices of each frame. Therefore, the transmitted signal T(t) of a frame is expressed as $$T(t) = A_T \cos\left(2\pi\left(f_c - \frac{\Delta B}{2}\right)t + \pi\frac{\Delta B}{\Delta T}t^2\right) \quad (1)$$

$$(0 \le t \le \Delta T),$$

where $A_T$ is the amplitude of the transmitted signal, $f_c$ is the center frequency of the modulated signal, $\Delta B$ is the operating bandwidth, and $\Delta T$ is the sweep time. The transmitted signal is also referred to as an up-chirp signal because its frequency increases rapidly. When the up-chirp signal is reflected from L targets, the received signal R(t) can be expressed as $$R(t) = \sum_{l=1}^{L} \left\{ A_{R_l} \cos\left(2\pi\left(f_c + f_{d_l} - \frac{\Delta B}{2}\right)(t - t_{d_l}) + \pi\frac{\Delta B}{\Delta T}(t - t_{d_l})^2\right)\right\} + n(t) \quad (2)$$

$$= \sum_{l=1}^{L} d_l(t) + n(t),$$

where $A_{R_l}$ (l=1, 2, . . . , L) is the amplitude of the signal reflected from the $l_{th}$ target, $f_{d_l}$ is the Doppler frequency caused by the relative velocity between the $l_{th}$ target and the radar, and $t_{d_l}$ is the time delay caused by the relative distance between the $l_{th}$ target and the radar. The desired signal, which contains the information of the $l_{th}$ target, is expressed as $d_l(t)$. Further, n(t) represents the noise added at the receiving antenna.

The transmitted signal T(t) is then multiplied with the received signal R(t) by passing through a frequency mixer. The output of the mixer M(t) is given as $$M(t) = T(t) \sum_{l=1}^{L} d_l(t) + T(t)n(t) \quad (3)$$

$$\left(\max_l t_{d_l} \leq t \leq \Delta T\right).$$

To extract the baseband signal, M(t) is passed through the low-pass filter. The filter output can then be approximated as $$L(M(t)) \cong \frac{1}{2} A_T \quad (4)$$

$$\sum_{l=1}^{L} A_{R_l} \cos\left(2\pi\left(\left(\frac{\Delta B}{\Delta T} t_{d_l} - f_{d_l}\right)t + \left(f_c + f_{d_l} - \frac{\Delta B}{2}\right)t_{d_l} - \frac{\Delta B}{2\Delta T} t_{d_l}^2\right)\right)$$

$$\left(\max_l t_{d_l} \leq t \leq \Delta T\right),$$

where L(•) indicates the low-pass filter output.

Because L(M(t)) is the sum of sinusoidal signals, the frequencies of each signal are extracted by applying the Fourier transform. The extracted frequencies $(\hat{f}_l)$ (where l=1, 2, ..., L) are then expressed as $$\hat{f}_l = \frac{\Delta B}{\Delta T} t_{d_l} - f_{d_l} \quad (5)$$

$$= \frac{\Delta B}{\Delta T} \frac{2R_l}{c} - \frac{2v_l}{c} f_c,$$

where $R_l$ and $v_l$ are the relative distance and relative velocity between the $l_{th}$ target and the radar, respectively, and c is the propagation velocity of the transmitted radar signal.

When measuring radar signals reflected from human faces, $\hat{f}_l$ can be approximated as $$\frac{\Delta B}{\Delta T} t_{d_l} \left( = \frac{\Delta B}{\Delta T} \frac{2R_l}{c} \right).$$

That is, $f_{d_l}$ due to the target velocity is negligible because several measurement points on the face are stationary against the radar. Therefore, using the beat frequency, the distance between the face and the radar can be estimated, which is calculated as $$\hat{R}_l = \hat{f}_l \times \frac{c\Delta T}{2\Delta B}. \quad (6)$$

Here, ΔT, ΔB, and c are already known in the radar system.

B. Measurement Environments

Figure 2A:
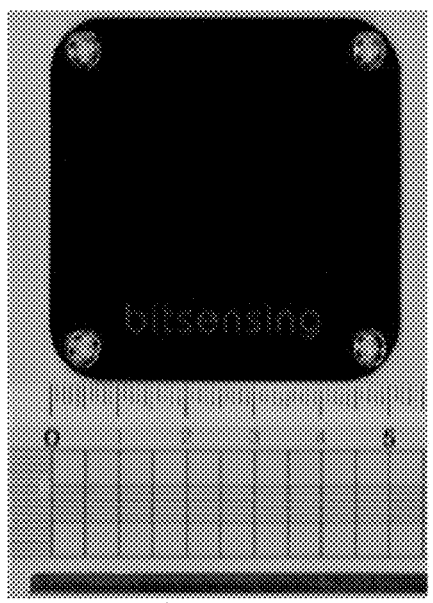
FIG. 2A is a millimeter wave FMCW radar in accordance with one implementation of the present disclosure.
Figure 2B:
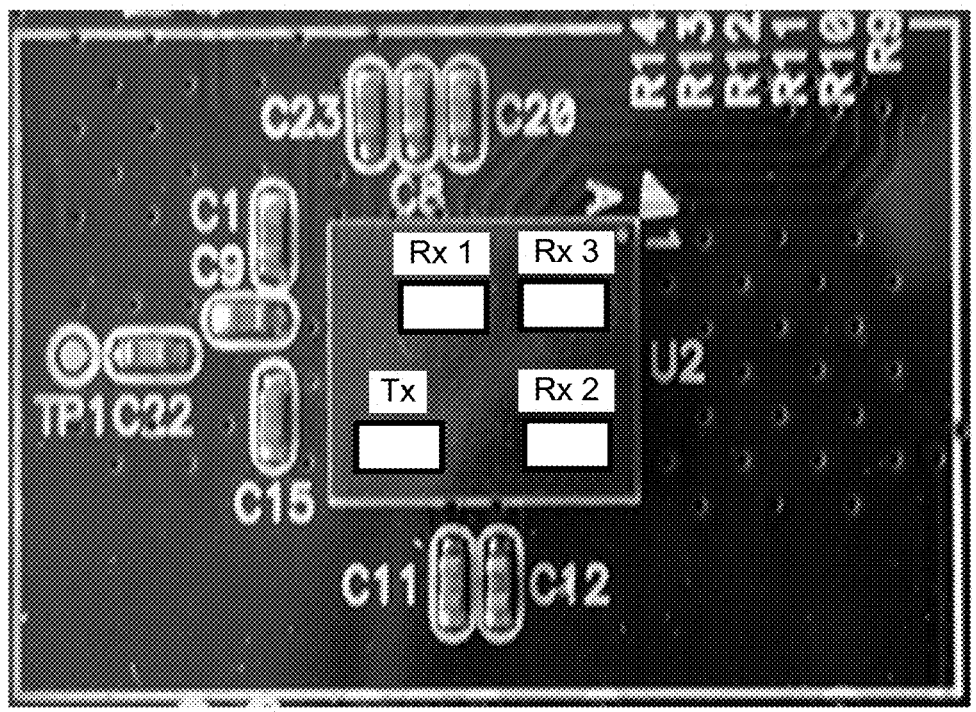
FIG. 2B shows a circuit layout of the FMCW radar including a single transmit antenna and three receiving antenna elements in accordance with one implementation of the present disclosure.

FIG. 2A is a millimeter wave FMCW radar in accordance with one implementation of the present disclosure. FIG. 2B shows a circuit layout of the FMCW radar including a single transmit antenna and three receiving antenna elements in accordance with one implementation of the present disclosure.

In the illustrated implementation of FIGS. 2A and 2B, the FMCW radar uses a single transmit antenna and three receiving antenna elements (two in the azimuth direction and two in the elevation direction, with one in each direction being shared by one antenna element). The distance between adjacent antenna elements is $$0.5 \frac{c}{f_c}.$$

In this antenna system, when $T_x$ transmits a signal, $R_x$ 1, $R_x$ 2, and $R_x$ 3 simultaneously receive the reflected signals. Although the illustrated implementation of FIG. 2B shows only 3 receiving antenna elements ($R_x$ 1, $R_x$ 2, $R_x$ 3), any number (two or more) of antenna elements may be used in other implementations. Further, $f_c$, ΔB, and ΔT in Equation (1) are set as 61 GHz, 6 GHz, and 12.5 ms, respectively. Moreover, one frame of the FMCW radar signal is 50 ms long, which consists of a 12.5 ms signal transmission time and a 37.5 ms signal processing time.

Figure 3A:
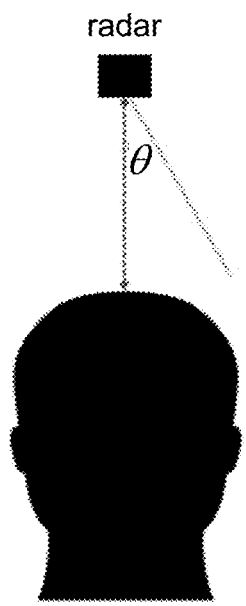
FIG. 3A shows an azimuth angle of the radar with respect to the face.
Figure 3B:
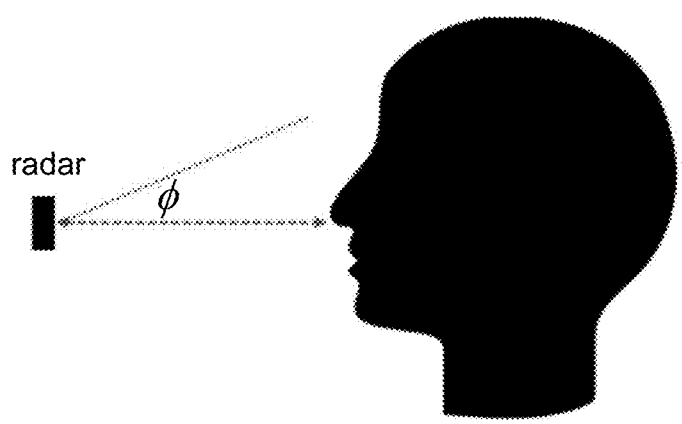
FIG. 3B shows an elevation angle of the radar with respect to the face.

With this radar, an experimental environment is setup as shown in FIGS. 3A and 3B and collects reflected radar signals. FIG. 3A shows an azimuth angle of the radar with respect to the face, while FIG. 3B shows an elevation angle of the radar with respect to the face.

In one example implementation having 8 subjects, radar signals are measured by changing the distance between the radar and the face from 30 cm to 50 cm. Further, because the reflected signal can vary depending on the azimuth and elevation angles (e.g., θ and φ in FIGS. 3A and 3B) between the face and the front direction of the radar, the received radar signal is acquired by changing θ and φ from −5° to −5°.

III. Proposed Face Classification Using DNN

A. Basic Principles of DNN

Figure 4:
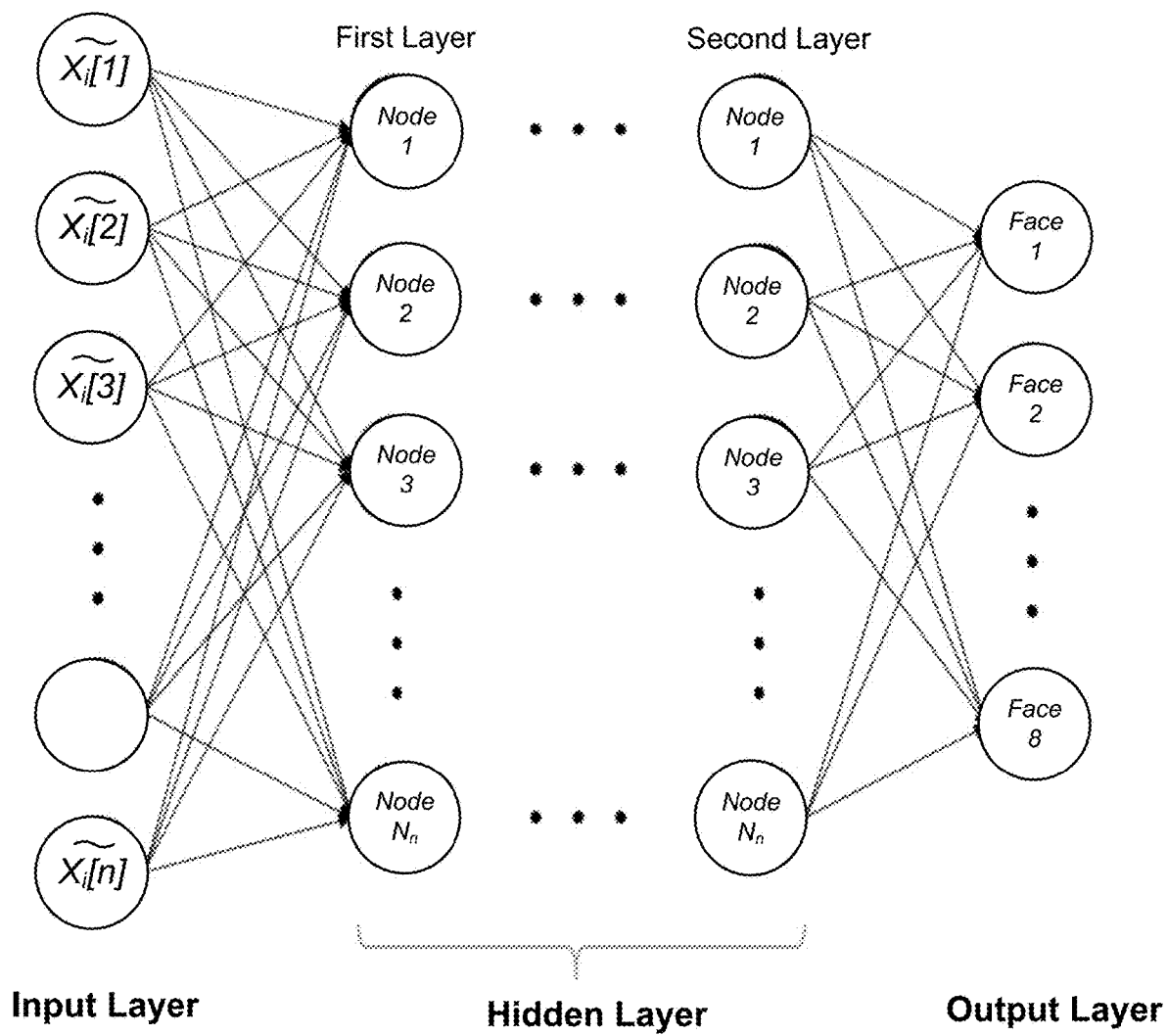
FIG. 4 shows a structure of the MLP network in accordance with one implementation of the present disclosure.
Figure 5A:
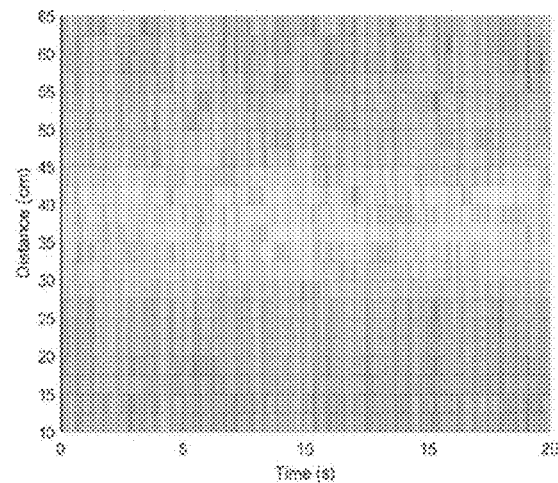
FIGS. 5A to 5H show the accumulated $F(L_3[n])$ of 8 human faces over 20 seconds when the faces are about 30-50 cm away from the center of the radar in accordance with one implementation of the present disclosure.
Figure 5B:
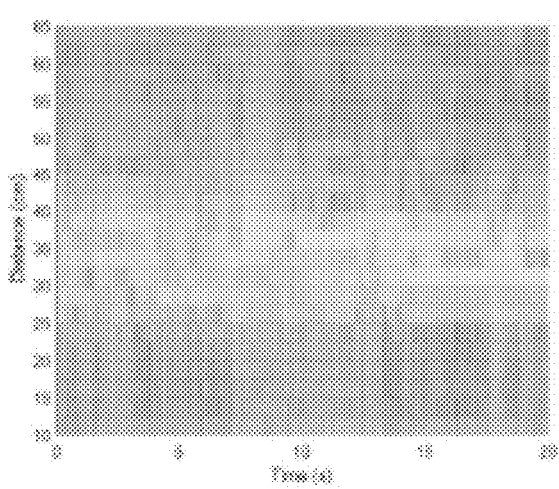
Figure 5C:
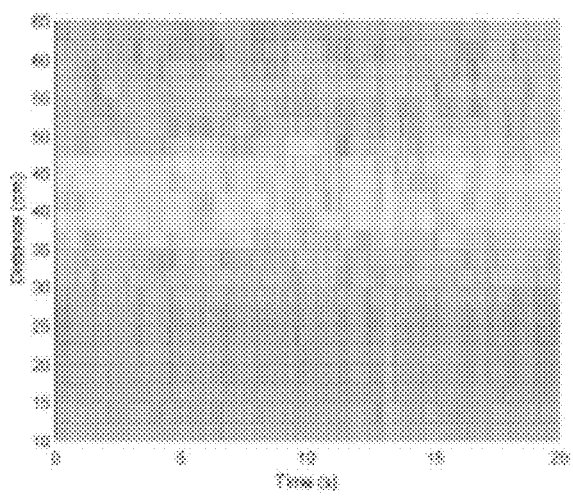
Figure 5D:
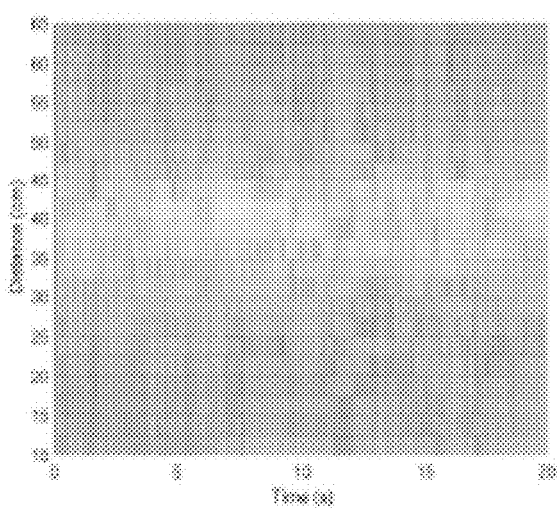
Figure 5E:
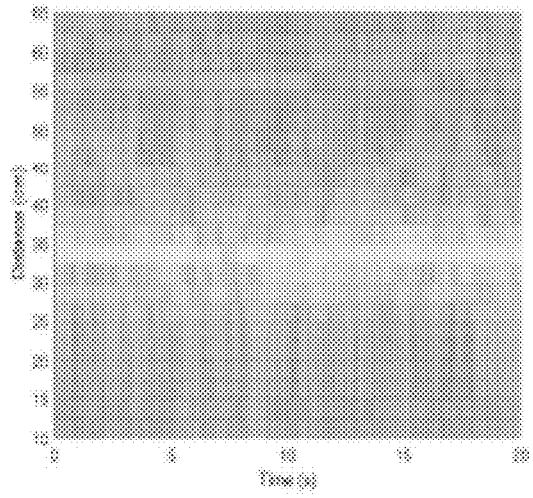
Figure 5F:
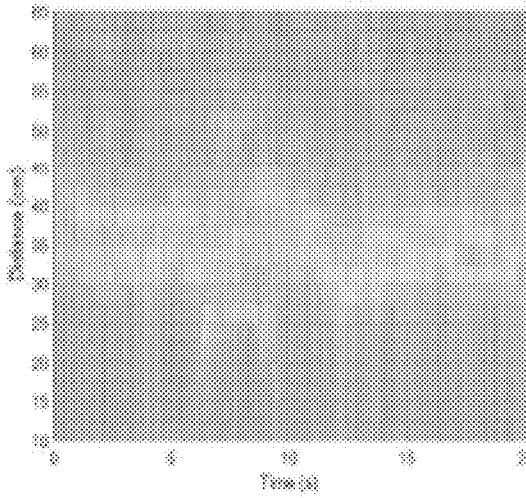
Figure 5G:
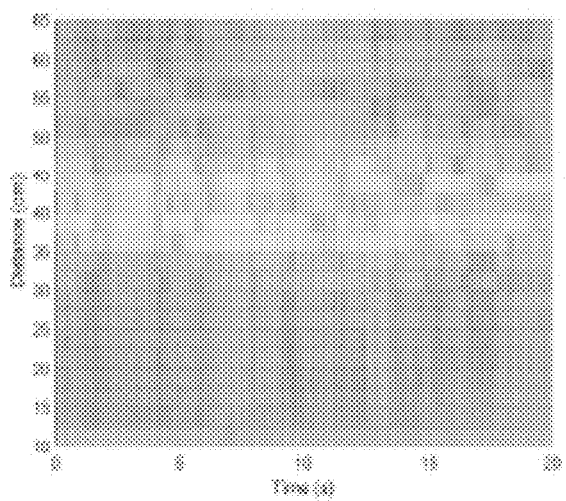
Figure 5H:
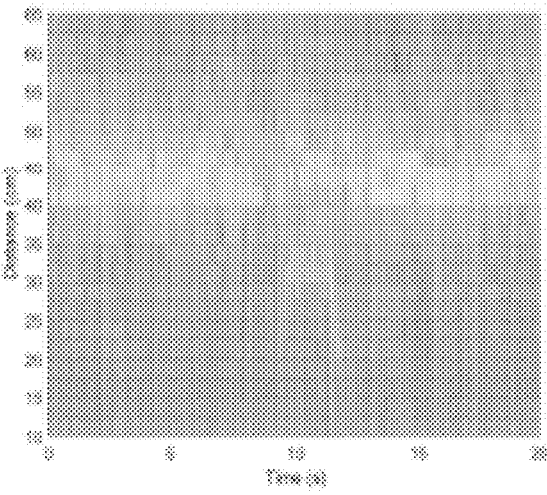

The most representative type of DNN structures is the multilayer perceptron (MLP), in which each layer is fully connected to its adjacent layers. FIG. 4 shows one example structure of the MLP network. The example structure includes an input layer, multiple hidden layers, and an output layer. Further, each layer is composed of a number of nodes, and each node is connected to nodes of adjacent layers. This network shown in FIG. 4 is trained through a repeated process of forward propagation and backward propagation. In the forward propagation, each layer passes its value to the next layer by using weights and an activation function. Let $X_i^{(k)}$ and $Y_o^{(k)}$ denote the input and output vector at k-th layer, and $W^{(k)}$ denote the weight matrix between the k-th and the (k+1)-th layers. Then, the input vector at (k+1)-th layer can be expressed as $$X_i^{(k+1)} = f_a(W^{(k)} Y_o^{(k)}), \quad (7)$$

where $f_a$ denotes the activation function that creates nonlinearity in the network. In contrast, the weight values are updated by computing the gradient of the cost function with respect to each weight in the backward propagation. If the weight value before backward propagation is $W_b$, the updated weight after the backward propagation $W_a$ is $$W_a = W_b - \alpha \times \frac{\partial J}{\partial W_b}, \quad (8)$$

where α denotes the learning rate that determines the speed of the learning and J denotes the cost function that indicates the error between the trained and the true values. Both forward and backward propagation, which is called an epoch, is repeated several times to train the weight matrix $W^{(k)}$ properly.

B. Radar Signal Preprocessing for Data Learning

To train a classifier using DNN, the input format must be determined appropriately. Thus, proper inputs are formulated based on the characteristics of the radar signal. If the signal received from each receiving antenna element is expressed as $R_q(t)$ (q=1, 2, 3), the low-pass filter output for each received signal is referred to as $L(T(t)R_q(t))=L(M_q(t))$. If this low pass filter output passes through the analog-to-digital converter and is sampled at a sampling frequency of $$f_s\left(=\frac{1}{T_s}\right),$$

the discrete filter output can be expressed as $$L_q[n]=[L(M_q(0)),L(M_q(T_s)),\ldots,L(M_q(N_s \times T_s))], \quad (9)$$

where $N_s$ denotes the number of sampled points. As mentioned in Section II-A, the distance between the face and the radar can be extracted by applying the fast Fourier transform (FFT) to this sampled signal, which can be expressed as $F(L_q[n])$.

Figure 6:
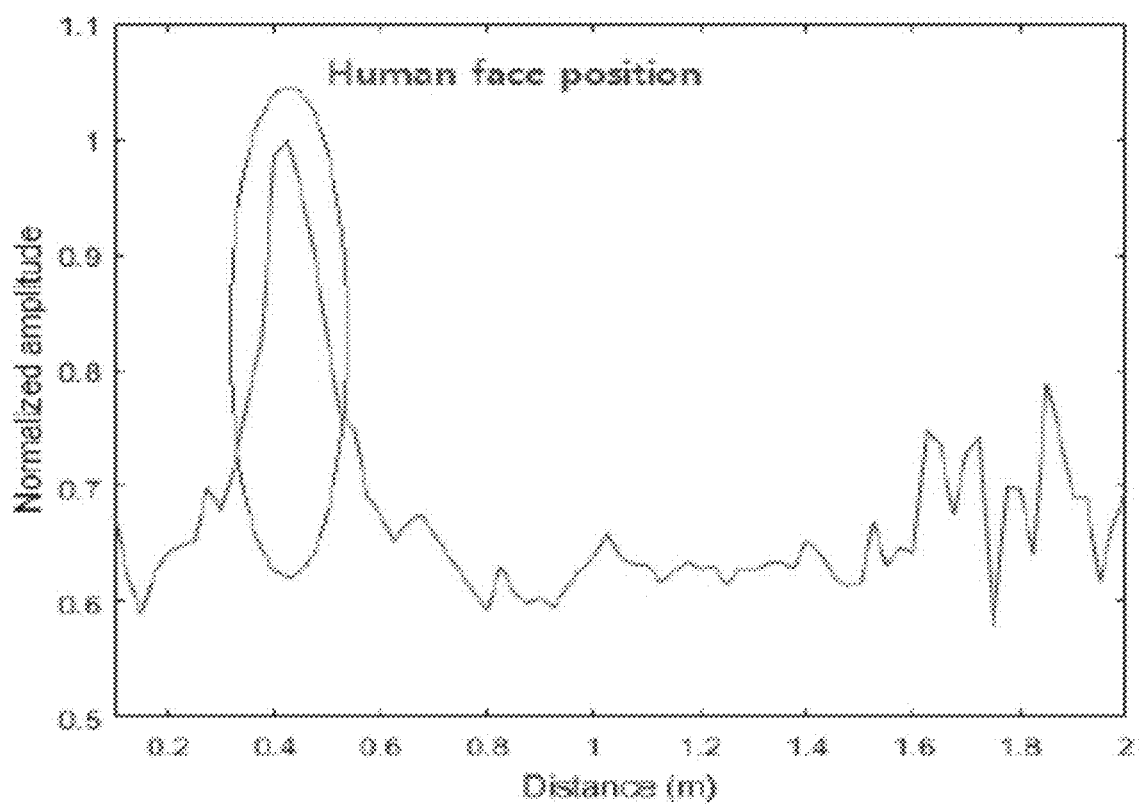
FIG. 6 shows the $F(L_3[n])$ for one subject, when the human face is about 40 cm away from the radar.

For example, FIG. 6 shows the $F(L_3[n])$ for one subject, when the human face is about 40 cm away from the radar. Thus, the number of FFT points (NF) is set equal to $N_s$. If the ordered statistic constant false alarm rate (OS-CFAR) detection algorithm is applied to $F(L_3[n])$, the FFT index corresponding to the position of the face can be extracted. From Equation (6), one FFT index can be calculated as 2.5 cm in the radar system of the present disclosure. In the above step, extracting FFT index includes appropriately bounding the output around the distance between the face and the radar (see FIG. 8). It should be noted that if the above-mentioned output is used serially (i.e., concatenated), the network used is classified as DNN. Otherwise, if the above-mentioned output is used in parallel, it is classified as another deep learning technique known as convolutional neural network (CNN).

FIGS. 5A through 5H show the accumulated $F(L_3[n])$ over 20 s when 8 human faces are about 30 to 50 cm away from the center of the radar. By converting the FFT index with Equation (6), the distance between the radar and the human face can be estimated. As shown in FIGS. 5A through 5H, the intensity of the reflected signal is strong around 40 cm. FIGS. 5A through 5H show a difference in the received signal for different faces located at the same distance. Further, the phase difference $e^{j\pi \sin \theta}$ exists between the antenna elements located in azimuth axis, while the phase difference $e^{j\pi \sin \varphi}$ exists between the antenna elements in the elevation axis. Thus, $F(L_1[n])$, $F(L_2[n])$, and $F(L_3[n])$ also have different patterns for the same face.

Generally, as the input of the DNN for the radar data, the feature vector of the extracted signal can be used, or the signal in the time domain or the frequency domain can be used as a whole. In the present disclosure, the signals received from all antenna elements are synthesized into one signal vector, which is used as an input to the DNN. That is, based on the above observations, the form of data input for training the DNN is expressed as $$X_i[k]=[\mathcal{F}(L_1[n]),\mathcal{F}(L_2[n]),\ldots,\mathcal{F}(L_q[n])]. \quad (10)$$

Figure 7:
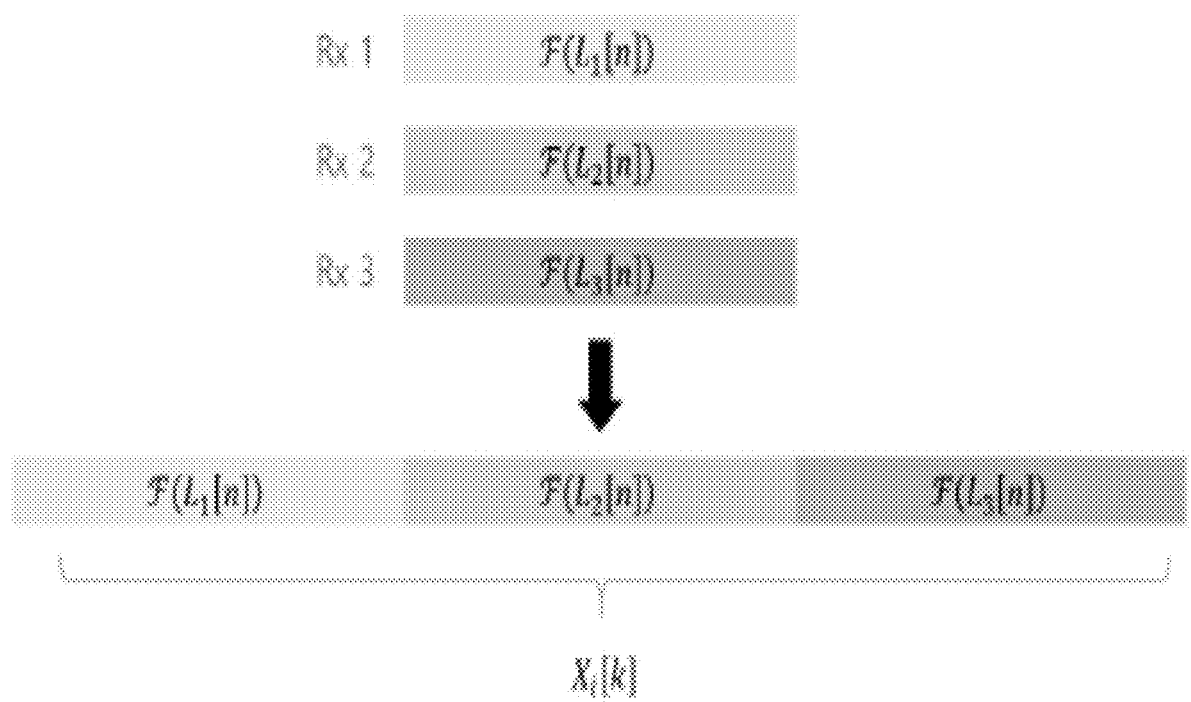
FIG. 7 shows a data vector for training the DNN in accordance with one implementation of the present disclosure.

As shown in FIG. 7, since there are three receiving antenna elements, $X_i[k]$ becomes a 1 by $3N_s$ vector. This data vector is extracted from each up-chirp signal (see FIG. 1). Input data is generated in units of frames mentioned in Section II-B. For each subject, 2,000 input data points (i.e., N=2000) are acquired by changing the measurement conditions (e.g., distances and angles). However, this vector is not used directly because the amount of calculation increases when using the whole signal and $X_i[k]$ contains useless signals that do not contain target information. Therefore, signals near the target are used.

Figure 8:
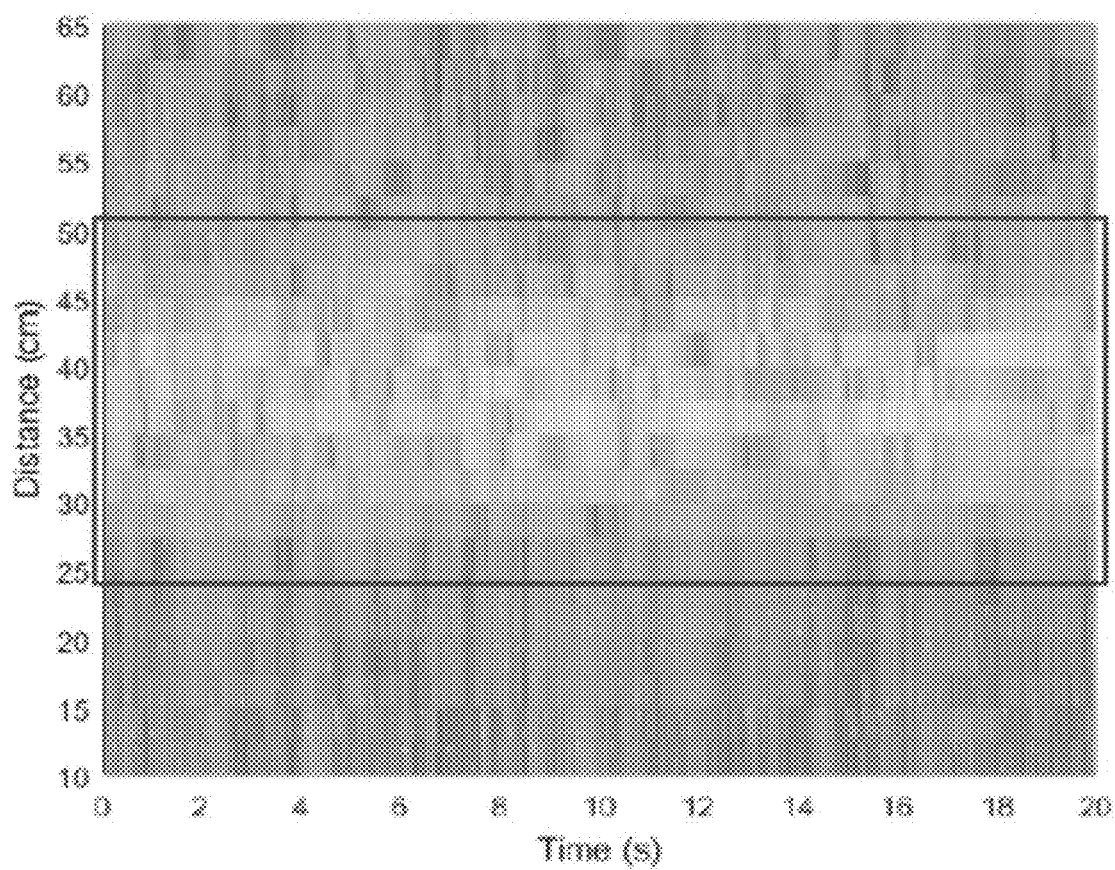
FIG. 8 shows a process for using only the signal part marked with a red rectangular box in accordance with one implementation of the present disclosure.
Figure 9:
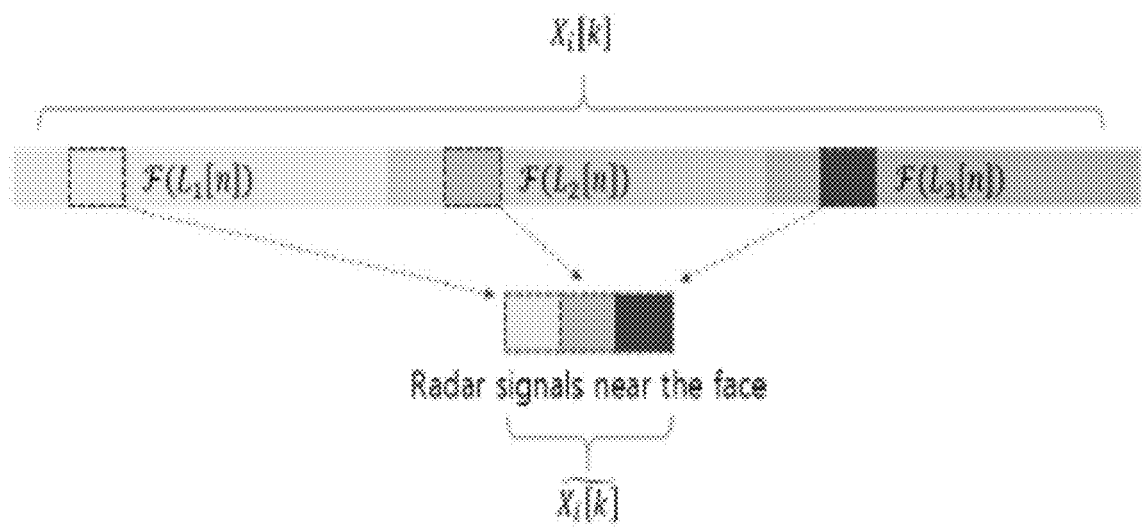
FIG. 9 shows an organization of the FFT index corresponding to the distance around the face.

In one example shown in FIG. 8, only the signal part marked with a red rectangular box is used. The OS-CFAR detection algorithm is then applied to each frame, and the FFT index corresponding to the position of the face is extracted. The signal near the extracted FFT index is then cut and used as the input to the network, which can be expressed as $$\tilde{X_i}[k]=[X_i[k_{tgt}-k_{cut}],X_i[k_{tgt}-k_{cut}+1],\ldots,X_i[k_{tgt}+k_{cut}],\\
X_i[N_F+k_{tgt}-k_{cut}], X_i[N_F+k_{tgt}-k_{cut}+1],\ldots,X_i\\
[N_F+k_{tgt}+k_{cut}],X_i[2N_F+k_{tgt}-k_{cut}], X_i[2N_F+k_{tgt}-\\
k_{cut}+1],\ldots,X_i[2N_F+k_{tgt}+k_{cut}]], \quad (11)$$

where $k_{tgt}$ is the FFT index corresponding to the distance to the face and $k_{cut}$ is the index of how far the distance around the face is considered. In the present case, $k_{cut}$ is set to 4 so that about 10 cm back and forth on the face can be covered. Thus, the refined input $\tilde{x_i}[k]$ can be organized as shown in FIG. 9.

C. Face Classification Results from DNN

As mentioned in Section III-B, 16,000 data points were obtained for 8 people. Further, 70%, 15%, and 15% of the total data were used as training, validation, and test sets, respectively. The structure of the DNN used in the present disclosure is shown in FIG. 4. As mentioned before, $\tilde{x_i}[k]$ is used as input vector to the network. Further, the output layer of this network appears as Face 1 through Face 8.

In general, the factors that have the greatest influence on the classification performance of the DNN structure are the number of hidden layers ($N_l$), the number of nodes ($N_n$) in each layer, and the type of activation function. Therefore, the classification accuracy is compared by changing the above-mentioned parameters to find an appropriate network structure for our radar system. The classification performance is first checked by setting the number of the hidden layers to 1 ($N_l=1$) and increasing the number of nodes in the hidden layer.

Figure 10:
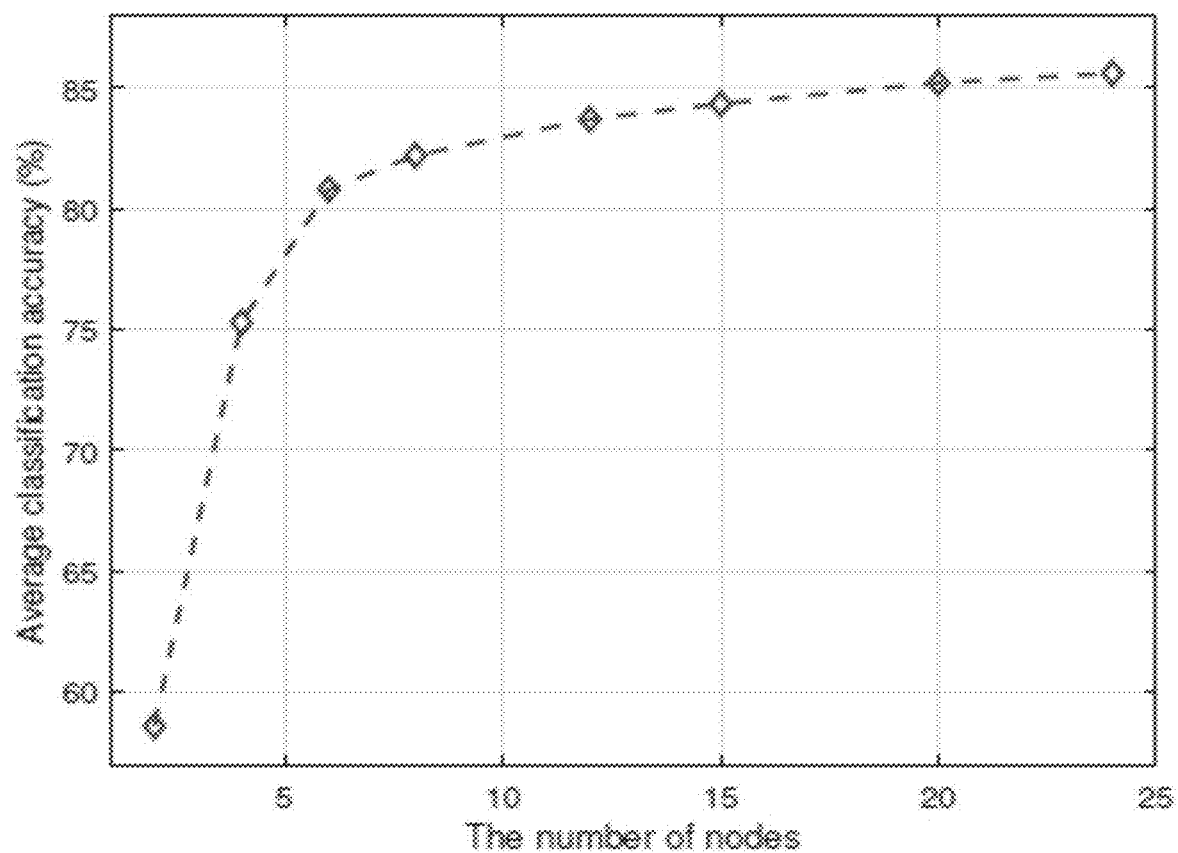
FIG. 10 shows an average face classification performance for 8 different subjects in accordance with one implementation of the present disclosure.
Figure 11:
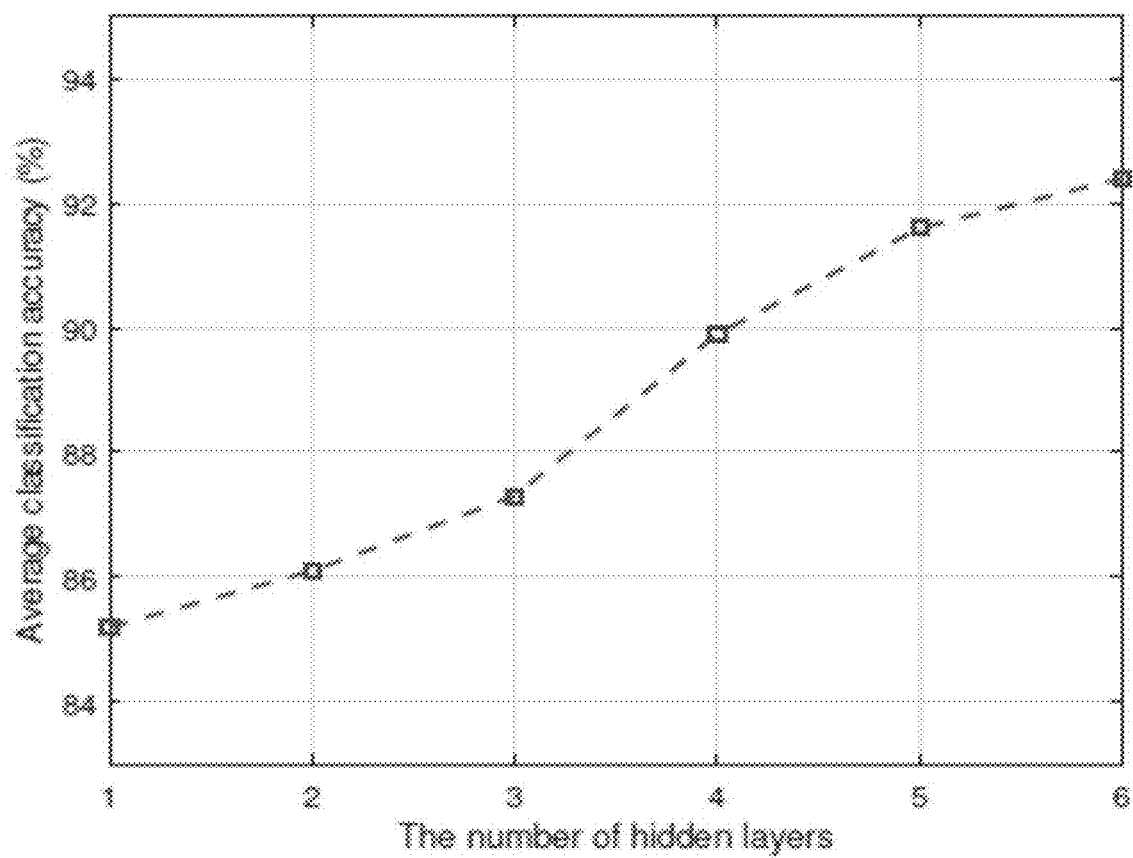
FIG. 11 shows the classification performance in accordance with one implementation of the present disclosure.

FIG. 10 shows the average face classification performance for 8 different subjects. When $N_n$ is 20 or more, it was confirmed that there is no further increase in the classification performance. Thus, $N_n$ was fixed as 20 and the classification performance was checked by changing $N_l$. As shown in FIG. 11, the classification performance almost converged when $N_l$ is 5 or more. Therefore, the values of $N_l$ and $N_n$ are set to 5 and 20, respectively, in this network. When the same operation was performed by changing the order of estimating $N_l$ and $N_n$, the values of the two factors were calculated to be substantially similar. Table I shows the confusion matrix when $N_l$ and $N_n$ are 5 and 20, respectively. The average classification accuracy for 8 subjects was above 92% on average.

TABLE I

| Estimated class | Actual class | | | | | | | |
|---|---|---|---|---|---|---|---|---|
| | Subject 1 | Subject 2 | Subject 3 | Subject 4 | Subject 5 | Subject 6 | Subject 7 | Subject 8 |
| Subject 1 | 87.42% | 0.57% | 0.29% | 3.43% | 0.29% | 1.71% | 0.00% | 1.43% |
| Subject 2 | 2.00% | 95.71% | 0.00% | 4.00% | 0.86% | 2.57% | 0.00% | 0.00% |
| Subject 3 | 0.57% | 0.29% | 95.72% | 2.29% | 0.29% | 0.29% | 2.00% | 1.43% |
| Subject 4 | 5.43% | 1.14% | 1.14% | 85.70% | 0.86% | 4.29% | 0.29% | 0.57% |
| Subject 5 | 0.86% | 0.00% | 0.00% | 0.29% | 94.27% | 2.00% | 0.00% | 0.00% |
| Subject 6 | 0.29% | 2.29% | 0.29% | 2.29% | 3.43% | 88.0% | 0.00% | 0.29% |
| Subject 7 | 0.57% | 0.00% | 1.71% | 1.14% | 0.00% | 0.00% | 97.14% | 1.43% |
| Subject 8 | 2.86% | 0.00% | 0.85% | 0.86% | 0.00% | 1.14% | 0.57% | 94.85% |

In addition to DNN, the classification performance is evaluated using the support vector machine (SVM) and tree-based methods, which are widely used for radar target classification. To train the classifier through the SVM, bagging tree, and boosting tree, a process of extracting features from data vector $\overline{x_i[k]}$ is required. In some implementations, features such as amplitude and Doppler frequency were extracted from the reflected signal to train the classifier. Further, features that represent the statistical characteristics of the distribution, such as mean, variance, skewness, and kurtosis, were used in other articles. The performance of these machine learning techniques varies greatly depending on the extracted features. Therefore, in the present disclosure, the signals of Equation (11) are put in as input data for both machine learning techniques to determine the classification performance for the same input data. That is, each sampled point of $\overline{x_i[k]}$ acts as features in both classifiers.

TABLE II

| Methods | Average classification accuracy |
|---|---|
| Proposed DNN | 92.4% |
| SVM | 85.5% |
| Bagging tree | 89.3% |
| Boosting tree | 69.8% |

Table II shows the following classification results. For these methods, the average classification accuracies were lower than that of the proposed method. In the case of these feature-based machine learning methods, the average classification accuracy may be improved if the appropriate features are extracted and used to train the classifier. However, the advantage of the proposed method of the present disclosure is that it shows high classification performance without such feature extraction.

Furthermore, the classification performance is also checked when the signals received from only one antenna element were used rather than from three receiving antenna elements. That is, the format of the input can be expressed as $$\overline{x_i[k]} = [X_i'[k_{tgt}-k_{cut}], X_i'[k_{tgt}-k_{cut}+1], \ldots, X_i'[k_{tgt}+k_{cut}-1], X_i'[k_{tgt}+k_{cut}]], \quad (12)$$

where $$X_i'[k] = [\mathcal{F}(L_q[n])]. \quad (13)$$

In the above case, the receiving antenna element index q can be 1, 2, or 3. If $\overline{x_i[k]}$ is used, the size of the input data is reduced to ⅓. While maintaining the structure of the DNN (e.g., the number of nodes, the number of hidden layers, and the activation function), the classification performance is evaluated using $\overline{x_i[k]}$. In this case, the average classification accuracy was 73.7%. Although $N_l$ and $N_n$ are changed, a classification accuracy of 80% or more was difficult to obtain. If only one antenna element is used, the azimuth or the elevation angle information of the target cannot be extracted from the received radar signal and the antenna diversity is also reduced. Therefore, when radar signals received from more receiving antenna elements are used, the average classification performance can be enhanced.

Figure 12:
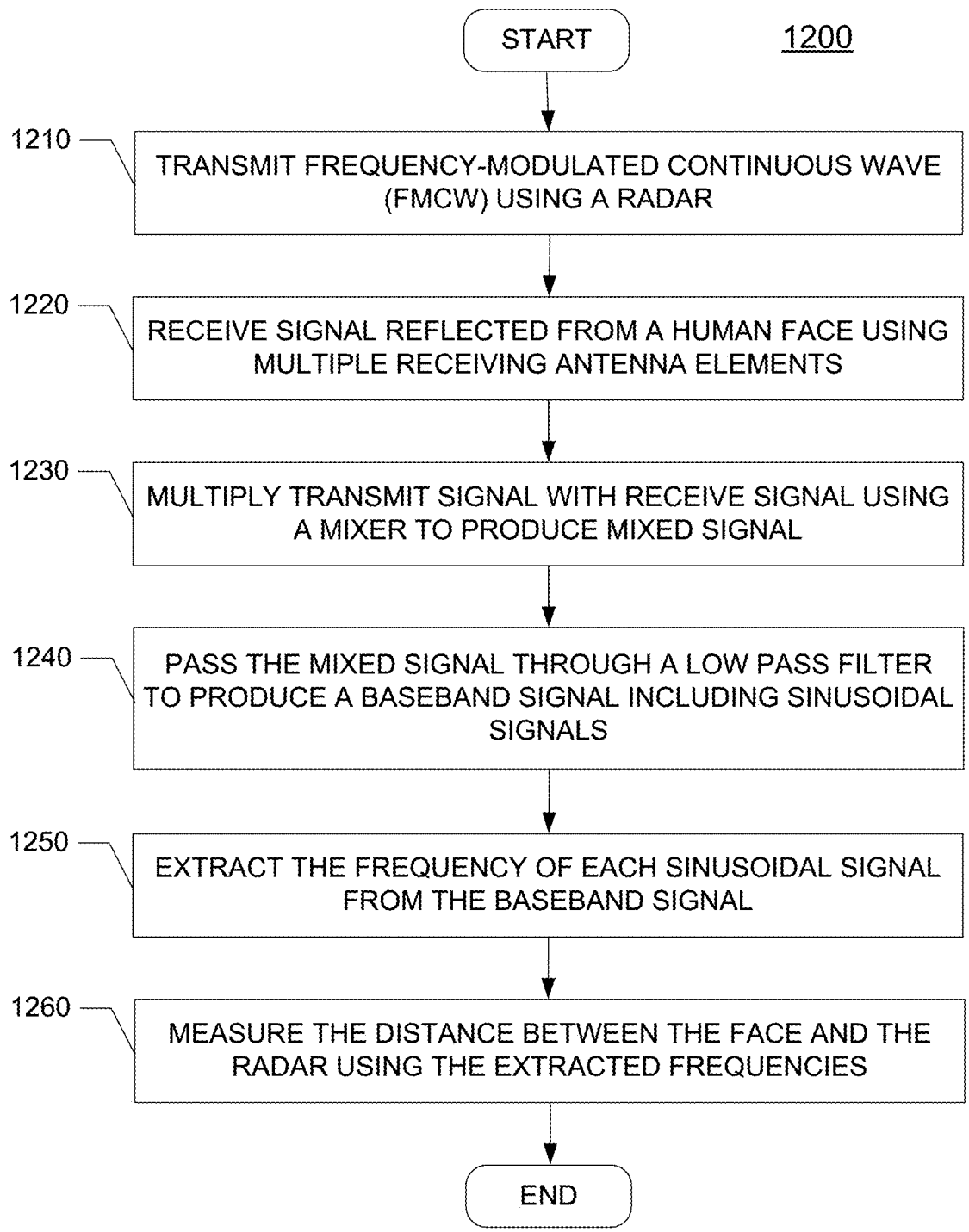
FIG. 12 is a flow diagram of a process for extracting target information from the radar signals and signal measurement environments in accordance with one implementation of the present disclosure.

FIG. 12 is a flow diagram of a process 1200 for extracting target information from the radar signals and signal measurement environments in accordance with one implementation of the present disclosure. In the illustrated implementation of FIG. 12, a frequency-modulated continuous wave (FMCW) signal is transmitted, at block 1210, using a radar. Signal reflected from a human face is then received, at block 1220, by multiple receiving antenna elements. Because the antenna elements are arranged in the elevation and azimuth directions, the spatial facial features of the person are contained in the received signals. Further, because the constituents of the face are different for each person, the reflection characteristics are also different for each person.

The transmit signal is multiplied with the receive signal, at block 1230, using a mixer to produce a mixed signal. The mixed signal is then passed through a low pass filter, at block 1240, to produce a baseband signal including sinusoidal signals. The frequency of each sinusoidal signal is extracted from the baseband signal, at block 1250. In one implementation, the frequency of each sinusoidal signal is extracted by applying Fourier transform. Subsequently, the distance between the face and the radar is measured, at block 1260, using the extracted frequencies. The signals received from multiple antenna elements are concatenated and the concatenated signals are then used as inputs to the deep neural network (DNN) to distinguish and/or recognize each person's face.

In one implementation, a method for extracting target information from signals of a radar and measurement environments is disclosed. The method includes: transmitting frequency-modulated continuous wave transmit signal using the radar; receiving reflected signal reflected from a human face at multiple antenna elements; multiplying the transmit signal with the reflected signal using a mixer to produce a mixed signal; passing the mixed signal through a low pass filter to produce a baseband signal including sinusoidal signals; extracting a frequency of each sinusoidal signal from the baseband signal to produce extracted frequencies; and measuring a distance between the human face and the radar using the extracted frequencies.

In one implementation, the method further includes receiving signals from the multiple antenna elements; and concatenating the signals. In one implementation, the method further includes inputting the concatenated signals into a deep neural network to distinguish and recognize the human face. In one implementation, the deep neural network includes a multilayer perceptron. In one implementation, the multiple antenna elements are arranged in elevation and azimuth directions such that the reflect signal includes spatial facial features of the human face. In one implementation, extracting a frequency of each sinusoidal signal includes applying Fourier transform. In one implementation, the transmit signal is an up-chirp signal which increase its frequency rapidly. In one implementation, the mixer is a frequency mixer. In one implementation, the radar is a millimeter-wave frequency-modulated continuous wave radar. In one implementation, extracting a frequency of each sinusoidal signal includes appropriately bounding each sinusoidal signal around the distance.

In another implementation, a non-transitory computer-readable storage medium storing a computer program to extract target information from signals of a radar and measurement environments is disclosed. The computer program includes executable instructions that cause a computer to: transmit frequency-modulated continuous wave transmit signal using the radar; receive reflected signal reflected from a human face at multiple antenna elements; multiply the transmit signal with the reflected signal using a mixer to produce a mixed signal; pass the mixed signal through a low pass filter to produce a baseband signal including sinusoidal signals; extract a frequency of each sinusoidal signal from the baseband signal to produce extracted frequencies; and measure a distance between the human face and the radar using the extracted frequencies.

In one implementation, the storage medium further includes executable instructions that cause the computer to receive signals from the multiple antenna elements; and concatenate the signals. In one implementation, the storage medium further includes executable instructions that cause the computer to input the concatenated signals into a deep neural network to distinguish and recognize the human face. In one implementation, the deep neural network includes a multilayer perceptron. In one implementation, the executable instructions that cause the computer to extract a frequency of each sinusoidal signal includes executable instructions that cause the computer to apply Fourier transform.

Figure 13:
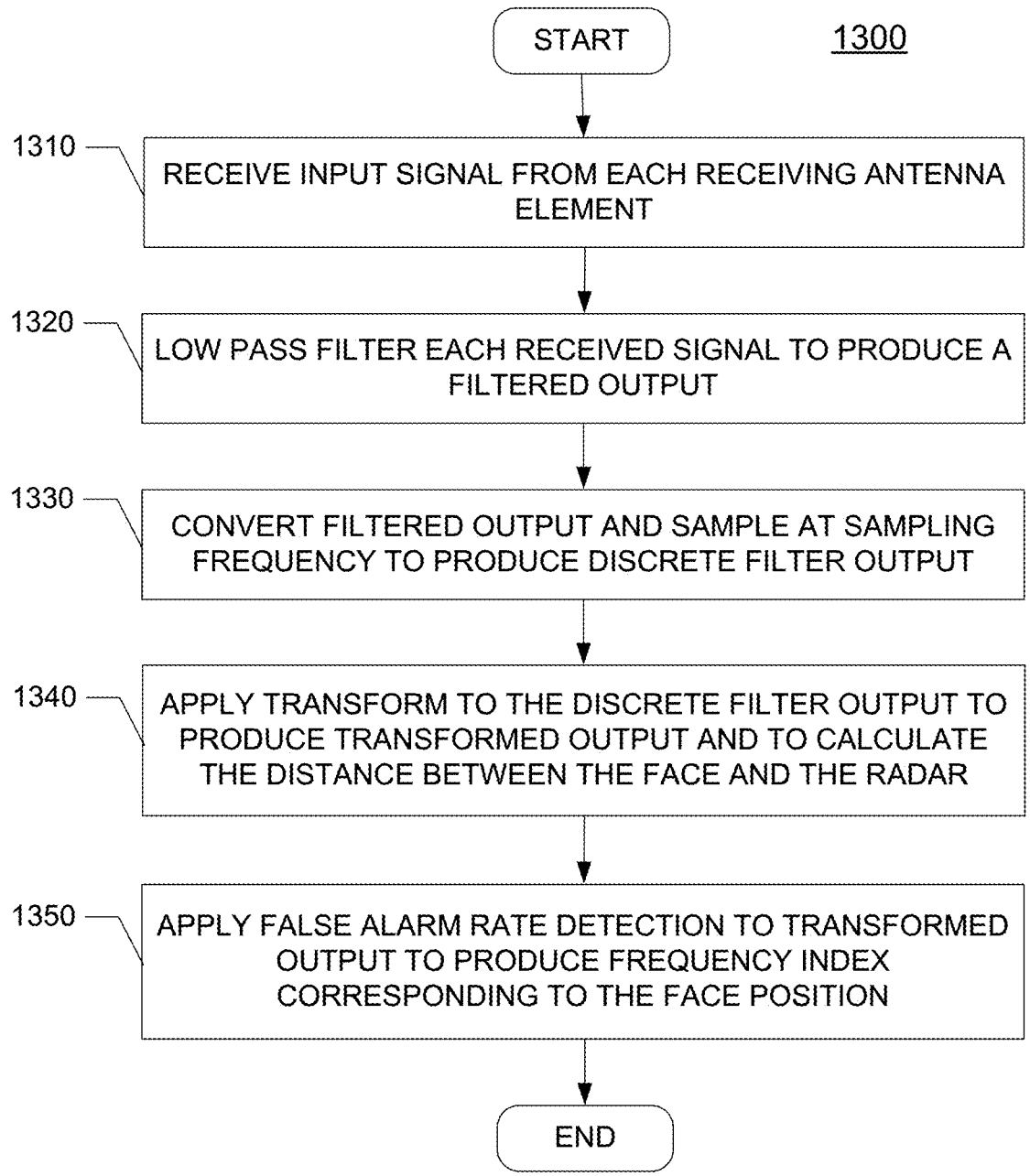
FIG. 13 is a flow diagram of a process for training the deep neural network (DNN) with acquired radar signal in accordance with one implementation of the present disclosure.

FIG. 13 is a flow diagram of a process 1300 for training the deep neural network (DNN) with acquired radar signal in accordance with one implementation of the present disclosure. In the illustrated implementation of FIG. 13, input signal is received, at block 1310, from each receiving antenna element. Each received signal is low pass filtered, at block 1320, to produce a filtered output. The filtered output is then passed through the analog-to-digital converter (ADC) and sampled at a sampling frequency, at block 1330, to produce a discrete filter output. A transform is applied to the discrete filter output, at block 1340, to produce a transformed output and to calculate the distance between the face and the radar. The false alarm rate detection technique is then applied to the transformed output, at block 1350, to produce a frequency index corresponding to the position of the face. In one implementation, the transform is Fast Fourier Transform (FFT) and the frequency index is an FFT index.

In one implementation, a method is disclosed. The method includes: receiving input signal from each of a plurality of receiving antenna elements of the radar, wherein the input signal is a reflected signal from a face; low pass filtering the input signal to produce a filtered output; passing the filtered output through an analog-to-digital converter and sampling at a sampling frequency to produce a discrete filter output; applying a transform to the discrete filter output to calculate a distance between the face and the radar; and applying a false alarm rate detection technique to the transformed output to produce a frequency index corresponding to the distance.

In one implementation, the method further includes inputting the frequency index into a deep neural network for training. In one implementation, the deep neural network includes a multilayer perceptron including a plurality of layers, wherein each layer is fully connected to its adjacent layers. In one implementation, the transform is a Fast Fourier Transform. In one implementation, the frequency index is a Fast Fourier Transform index.

IV. Conclusion

In the present disclosure, the faces of multiple subjects are distinguished by using the data obtained from the small-sized 61 GHz FMCW radar sensor. First, the radar signals are acquired by changing distances and angles between the radar and the faces of the subjects. The concatenating signals received from spatially independent receiving antenna elements in one frame are placed together as an input of the DNN. The faces of the subjects are classified with an accuracy of over 92% with the proposed method of the present disclosure. The performance of the proposed method is then compared with feature-based machine learning methods, such as SVM or tree-based methods. The proposed method showed better classification accuracy. Further, the fact that the face classification performance is better is confirmed when multiple antenna elements were used. Through the proposed face classification using a small-sized radar sensor, the weakness of the camera-based face recognition method was substantially compensated.

The above description of the disclosed implementations is provided to enable any person skilled in the art to make or use the invention as described in the specification presented above. Various modifications to these implementations will be readily apparent to those skilled in the art, and the generic principles described herein can be applied to other implementations without departing from the spirit or scope of the disclosure. Although the above descriptions mention using the traffic x, other uses for the collected traffic data are contemplated. For example, x. Further, although the sensor is described as sensing vehicles on the road, other objects or being can be sensed such as humans or animals. Accordingly, the techniques are not limited to the specific examples described above. Thus, it is to be understood that the description and drawings presented herein represent a presently possible implementation of the disclosure and are therefore representative of the subject matter that is broadly contemplated by the present disclosure. It is further to be understood that the scope of the present disclosure fully encompasses other implementations that may become obvious to those skilled in the art and that the scope of the present disclosure is accordingly limited by nothing other than the appended claims.

The invention claimed is:

1. A method for extracting target information from signals of a radar and measurement environments, the method comprising:
   training a deep neural network using signals received by antenna elements respect to a plurality of human faces;
   transmitting frequency-modulated continuous wave transmit signal using the radar;
   receiving reflected signal reflected from a human face at multiple antenna elements;

concatenating signals received from the multiple antenna elements;

multiplying the transmit signal with the reflected signal using a mixer to produce a mixed signal;

passing the mixed signal through a low pass filter to produce a baseband signal including sinusoidal signals;

extracting a frequency of each sinusoidal signal from the baseband signal to produce extracted frequencies;

measuring a distance between the human face and the radar using the extracted frequencies;

cutting the concatenated signals based on the measured distance; and inputting the cut concatenated signals into the trained deep neural network to classify the human face as one of the plurality of human faces.

2. The method of claim 1, wherein the deep neural network includes a multilayer perceptron.

3. The method of claim 1, wherein the multiple antenna elements are arranged in elevation and azimuth directions such that the reflect signal includes spatial facial features of the human face.

4. The method of claim 1, wherein extracting a frequency of each sinusoidal signal includes applying Fourier transform.

5. The method of claim 1, wherein the transmit signal is an up-chirp signal which increase its frequency.

6. The method of claim 1, wherein the mixer is a frequency mixer.

7. The method of claim 1, wherein the radar is a millimeter-wave frequency-modulated continuous wave radar.

8. The method of claim 1, wherein extracting a frequency of each sinusoidal signal comprises bounding each sinusoidal signal around the distance.

9. A method comprising:

training a deep neural network using signals received by antenna elements respect to a plurality of human faces;

receiving input signal from each of a plurality of receiving antenna elements of a radar, wherein the input signal is a reflected signal from a face;

concatenating signals received from the plurality of receiving antenna elements;

low pass filtering the input signal to produce a filtered output;

passing the filtered output through an analog-to-digital converter and sampling at a sampling frequency to produce a discrete filter output;

applying a transform to the discrete filter output to calculate a distance between the face and the radar;

cutting the concatenated signals based on the calculated distance;

inputting the cut concatenated signals into the trained deep neural network to classify the face as one of the plurality of human faces; and applying a false alarm rate detection technique to the transformed output to produce a frequency index corresponding to the distance.

10. The method of claim 9, further comprising:

inputting the frequency index into a deep neural network for training.

11. The method of claim 10, wherein the deep neural network includes a multilayer perceptron including a plurality of layers, wherein each layer is fully connected to its adjacent layers.

12. The method of claim 9, wherein the transform is a Fast Fourier Transform.

13. The method of claim 9, wherein the frequency index is a Fast Fourier Transform index.

14. A non-transitory computer-readable storage medium storing a computer program to extract target information from signals of a radar and measurement environments, the computer program comprising executable instructions that cause a computer to:

train a deep neural network using signals received by antenna elements respect to a plurality of human faces;

transmit frequency-modulated continuous wave transmit signal using the radar;

receive reflected signal reflected from a human face at multiple antenna elements;

concatenate signals received from the multiple antenna elements;

multiply the transmit signal with the reflected signal using a mixer to produce a mixed signal;

pass the mixed signal through a low pass filter to produce a baseband signal including sinusoidal signals;

extract a frequency of each sinusoidal signal from the baseband signal to produce extracted frequencies;

measure a distance between the human face and the radar using the extracted frequencies;

cut the concatenated signals based on the measured distance; and input the cut concatenated signals into the trained deep neural network to classify the human face as one of the plurality of human faces.

15. The non-transitory computer-readable storage medium of claim 14, wherein the deep neural network includes a multilayer perceptron.

16. The non-transitory computer-readable storage medium of claim 14, wherein the executable instructions that cause the computer to extract a frequency of each sinusoidal signal comprises executable instructions that cause the computer to apply Fourier transform.

* * * * *